Jan. 1, 1929.

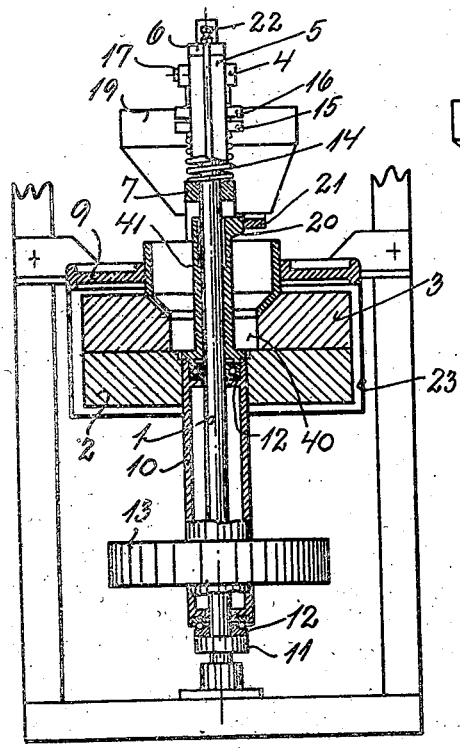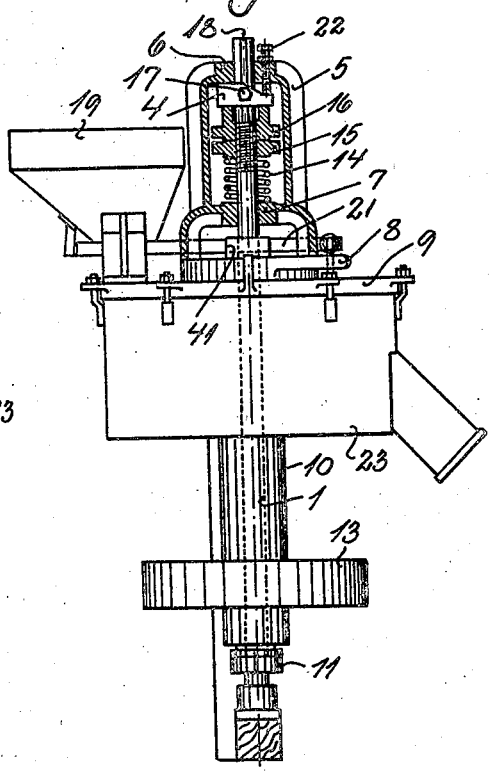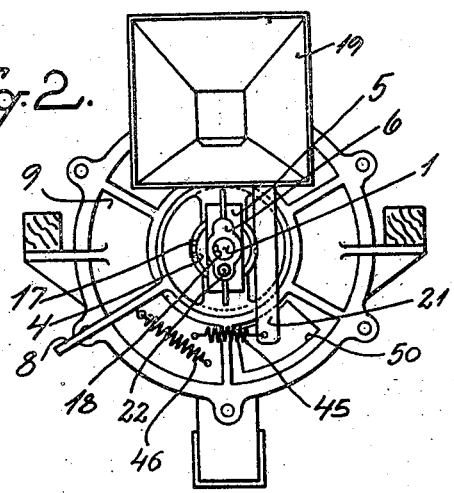

S. BJERRE 1,697,750

GRINDING MILL

Filed May 19, 1925   2 Sheets-Sheet 2

INVENTOR

William Bjerre

By Emil Bönnelycke

Attorney

Patented Jan. 1, 1929.

1,697,750

UNITED STATES PATENT OFFICE.

SILIAM BJERRE, OF SKIVE, DENMARK.

GRINDING MILL.

Application filed May 19, 1925, Serial No. 31,335, and in Denmark June 6, 1924.

The present invention relates to the type of grinding mill which comprises a stationary and a rotary grinding member, one of which is moved in axial direction relatively to the other one if the mill is overloaded, and the invention has for its object to provide a mill the two grinding members of which may easily be separated from one another without their adjustment being thereby altered, and the supply of grain to which is adjusted automatically in such a manner that if a certain permissible loading is exceeded, then one of the grinding members is moved automatically in axial direction away from the other grinding member, whereby the mill becomes unloaded more or less. This movement of the said grinding member may be utilized simultaneously, according to the present invention, to actuate the grain supply device for instance the oscillating tray of the same, in such a manner that the supply of grain is reduced until the excess load disappears.

Figure 4:
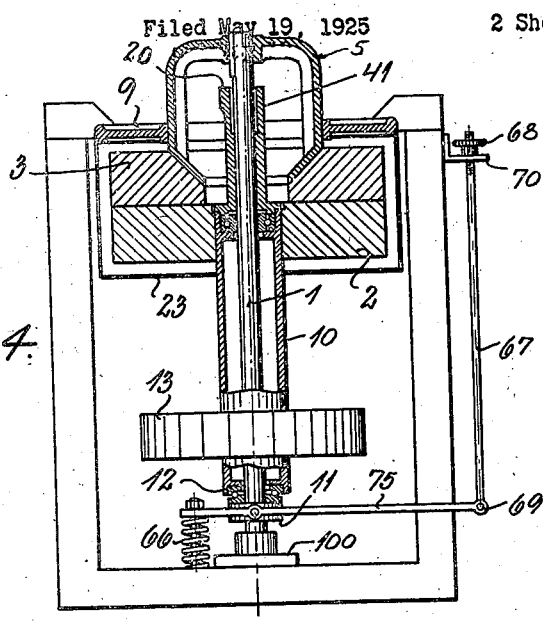
Figure 5:
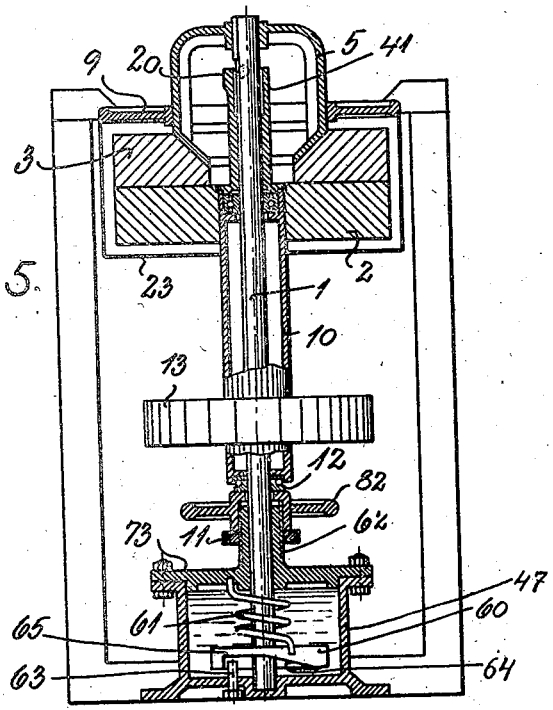

The present invention involves a simple form of mill which is easy to take apart and easy to adjust, and various constructions of the same are illustrated on the drawing, Fig. 1 shows a vertical section of one embodiment of the mill with axially movable non-rotary grinding member, Fig. 2 shows the same in top view, Fig. 3 shows the same in side elevation, Fig. 4 is a longitudinal section of a mill the rotary grinding member of which is axially movable, Fig. 5 is a longitudinal section of a modified embodiment of the mill shown in Figs. 1 to 3.

The principal distinguishing feature of the present mill is that it is fitted with a stationary shaft 1, Fig. 1, about which the rotary grinding member 2 is journalled as well as the non-rotary grinding member 3. In the embodiment shown the shaft 1 is vertical, and the upper grinding member 3 has rigidly connected to it a hub 5 provided with upper and lower guide collars 6 and 7 through which the shaft passes; the upper collar resting on a supporting collar 4 fixed on the shaft. The hub 5 and the grinding member 3 are loose on the shaft 1, but are prevented from following the rotation of the grinding member 2 by means of an arm 8 projecting from the hub 5, Fig. 2, and held in contact with a stationary portion of the mill, for instance the cover 9 of the dust case 23, by a helical spring 46.

The rotary grinding member 2 is attached to a hollow shaft 10. The latter encircles the shaft 1 and is guided about the same by means of ball-bearings 12, the lower one of which rests on a shoulder or collar 11 on the shaft 1. The shaft 10 is rotated about the shaft 1 by means of a belt-driven pulley 13 on the shaft 10.

The two grinding members 2 and 3 are pressed against one another partly by the dead weight of the grinding member 3 and partly by a spring 14 encircling the shaft 1 and interposed between the lower collar 7 and a nut 15 screwed onto the shaft 1. The said nut is held securely in position by means of a lock-nut 16 on which the collar 4 is supported. By means of a screw 17 the collar 4 is guided in a longitudinal groove 18 in the shaft 1, in such a manner that it cannot rotate relatively to the shaft. By rotation of the nut 16 the collar 4 is moved axially, whereby the space between the two adjacent grinding surfaces of the grinding members 2 and 3 may be adjusted.

The grain or the like to be ground is supplied to the mill by way of a hopper 19 and an oscillating tray or other discharge element 21 of known construction disposed below the said hopper. The said oscillating tray is disposed on top of the mill and conveys the grain to an aperture 50 in the cover 9 whence the grain slides down into a central recess 40 in the grinding member 3. The oscillating tray is operated by a cam or cams 20 provided on a sleeve 41 which encircles the shaft 1, and is connected to the shaft 10, Fig. 1, in such a manner that it follows the rotation of the latter so that during the rotation of the shaft 10 the cam 20 strikes the side of the tray. A spring 45 (Fig. 2) tends to keep the oscillating tray in contact with the sleeve 41.

If for some reason or other the mill is overloaded, for instance by foreign bodies entering into the space between the grinding members 2 and 3, then the friction between the latter will exceed a certain predetermined value whereby the torsional moment of the friction acting on the grinding member 3 will overcome the torsional moment of the spring 46 acting on the same grinding member by way of the arm 8. The hub 5 with the grinding member 3 provided thereon will then rotate about the shaft 1, whereby an adjustable screw 22 attached to the top guide 6 of the hub 5 and resting on the collar 4 will slide on the said collar. The upper face of the collar being formed with an oblique portion (Fig. 1) or with an oblique groove in which the end of the screw 22 is slidably received, the said screw will be lifted, thereby raising the hub 5 and the grinding member 3 so that the latter will be lifted above the grinding member 2, and the load on the mill will thus be relieved.

When the cause of the excessive loading is removed, the spring 46 will return the grinding member 3 into the position shown in Fig. 1.

The grinding members are encased in a dust casing 23 which is closed by the cover 9. The bottom portion of the hub 5 is annular, and is fitted in a central opening in the cover 9, whereby a lateral guide for the hub 5 and, thereby, for the shaft 1 is secured.

The oscillating tray 21 is suitably journalled in such a manner that rotation of hub 5 (or a lug or arm on the same) during excessive loading will swing the oscillating tray more or less outward, i. e. away from the cam or cams 20. The latter will then actuate the oscillating tray less intensively or—if the hub 5 is rotated considerably—maybe not at all, whereby the supply of grain will become reduced or entirely stopped, respectively, until the excess load disappears.

It will be apparent from the above that the two grinding surfaces may be spaced from one another, when desired, by turning the arm 8 by hand. This is especially of importance when the mill is to be started.

The individual parts of the present mill may be given any other suitable shapes than the particular ones shown on the drawing, without departing from the scope of the invention. Thus the spring 46, for instance, may be omitted, if one end of the spring 14 is connected for instance to the hub 5, and the other end for instance to the nut 15 and if, when being inserted between these members, the said spring is twisted so much that it will exert a torsional moment on the grinding member sufficient to counteract the tendency of the grinding member to follow the rotation of the grinding member 2.

In the construction shown in Figs. 1 to 3, the grinding member 3 is axially movable on the stationary shaft 1. In the construction shown in Figs. 4 and 5 the hub 5 of the grinding member 3 is keyed to the shaft 1, in such a manner that a relative axial displacement of the two grinding members must be effected either by the stationary shaft being moved axially together with the non-rotary grinding member or by the rotary grinding member being moved axially relatively to the stationary shaft.

In the construction shown in Fig. 4, the collar 11 which supports the rotary shaft 10 is axially movable along the shaft 1, it being supported by a lever 75, the point of pivotal connection of which to said collar is adjustable, one end of the lever 75 resting on a spring 66, while the other end of the said lever is hinged at 69 to an endwise-movable vertical supporting rod 67 adapted to be adjusted by means of a nut 68, in such a manner that the said lever and, hence, the collar 11 may be raised or lowered as desired, whereby the grinding members 2 and 3 will be moved toward or from one another.

When the mill is overloaded, the pressure between the grinding members will push downward the shaft 10 of the rotary grinding member 2 while displacing the collar 11 and compressing the spring 66, the initial tension of which is adjusted in such a manner that it does not allow the said motion of the rotary grinding member to take place until the pressure between the grinding members exceeds a certain predetermined limit.

The nut 68 rests on a bracket 70 or the like on the mill frame, and the shaft 1 rests in a step-bearing 100.

In the construction shown in Fig. 4, the stationary shaft 1 is supposed to be vertical, but nothing prevents it from being horizontal, while still remaining within the scope of the invention.

In the construction shown in Fig. 5 there is provided on the bottom end of the shaft 1 a cam disc 60 which is enclosed in an oil-filled vessel 47 on the cover 73 of which the collar 11 is mounted adjustably by being screwed down onto a nipple 62 on the cover 73. Between the cam disc 60 and the cover 73 on the vessel 47 there is inserted a helical spring 61 encircling the shaft and having one end connected to the cover 73, while the other end thereof is connected to the cam disc 60.

The helical spring 61 is held in compression in such a manner that it tends to force the shaft 1 downward, in such a manner that the shaft 1 cannot be raised without overcoming a pressure from the spring 61 adjusted according to the desired pressure between the grinding members.

The shaft 10 of the rotary grinding member 2 rests, as mentioned above, on the collar 11. Between the latter and the lower end of the shaft 10 there is inserted, however, an adjusting nut 82 screwed onto the nipple 62, by means of which nut the shaft 10 and, hence, the rotary grinding member may be adjusted suitably in vertical direction, and the collar then screwed firmly against the bottom face of the nut 82.

If the mill shown in Fig. 5 is overloaded, the friction between the grinding members 2 and 3 will result in the non-rotary grinding member 3 tending to follow the rotation of the rotary grinding member 2. Thereby the shaft 1 onto which the grinding member 3 is keyed will be rotated, and the cam disc 60 will thereby be moved along the top of a screw or other stop 63 provided at the bottom of the vessel 47. The inclined face 64 of the cam disc 60 engages the said stop 63 during this movement and thereby causes the cam disc 60 and the shaft 1 to be raised, whereby the grinding member 3 will be displaced axially away from the grinding member 2 and the overload will be relieved. The tension of the spring 61 is adjusted in such a manner that it will prevent the grinding member 3 from following the rotation of the shaft 1 as long as the friction between the two grinding members does not exceed a certain limit.

The provision of the cam disc 60 and the spring 61 in the oil-filled vessel 47 contributes very essentially to reduction of the friction between the cam disc 60 and the stop 63, so that this friction may always be relied on to be of uniform value, and the mill will therefore always be unloaded automatically when one and the same maximum load has been reached.

As shown in Fig. 5, the cam on the bottom side of the cam disc 60 is furnished with a face 65 at right angles to the shaft 1.

Consequently the shaft 1 with the grinding member 3 may turn through an angle the size of which depends on the length of the said face 65 without any elevation of the shaft 1 and the grinding member 3 being thereby effected. Therefore no real unloading of the mill will be effected by relative displacement of the grinding members, but the said angular motion may be utilized to cause, during its duration, a reduction of the motions of the oscillating tray (not shown) in the same manner as explained in the case of Figs. 1 to 3. The reduced, maybe entirely stopped, motions of the oscillating tray cause the supply of grain to the grinding members to be stopped partly or entirely, whereby the mill will be unloaded. Only when foreign bodies penetrate into the space between the grinding members, the friction between the grinding members will turn the cam disc 60 so far that the inclined cam face 64 of the same will be moved over the stop 63, whereby the grinding members will become separated from one another.

If desired, the dust casing 23 may be connected firmly to the grinding member 3 in such a manner that it will follow the rotation of the latter, and the rotation of the dust casing may then be utilized to push the oscillating tray away from the cams 20.

Having now particularly described and ascertained the nature of my said invention and in what manner the same is to be performed, I declare that what I claim is:—

1. A grinding mill, comprising a pair of coacting grinding members; a hollow rotary shaft to which one member is secured; a normally stationary shaft extending through the hollow shaft and carrying the other grinding member; a movable element to deliver the material to be ground to the grinding members; means connected to the rotary shaft for imparting an oscillating motion to said movable element; and means to connect the second-named grinding member resiliently to the stationary part of the mill, so that when the friction between the grinding members exceed a certain limit, said second-named grinding member will be rotated through an angle against the action of said resilient connecting means, whereby said movable element will be displaced relatively to said oscillating means and the supply of material to the grinding members will be reduced until the overload disappears.

2. A grinding mill, comprising a pair of coacting grinding members; a rotary shaft to which one member is secured; a normally stationary shaft carrying the other member; a feed hopper for the material to be ground; a movable discharge element carried by said hopper to deliver the material between said members; a sleeve connected to the rotary shaft to rotate therewith and provided with a cam; and means for yieldingly holding said discharge element against said sleeve so as to be oscillated during and consequent upon the rotation of the sleeve.

3. A grinding mill, according to claim 2, in which the rotary shaft is hollow and has the cam sleeve secured to one end thereof; and in which the normally stationary shaft extends axially through said rotary shaft and sleeve.

4. A grinding mill, comprising a hollow rotary shaft; driving means therefor; a grinding member secured to said shaft; a normally stationary shaft extending through the hollow shaft; a yoke carried by the stationary shaft; a grinding member rigidly secured to the yoke for coaction with the first-named member in grinding material introduced between them; a feed hopper; a swinging discharge element carried by said hopper for delivering the material therefrom to the grinding members; a sleeve secured to the rotary shaft to rotate therewith and through which the stationary shaft extends; a cam on said sleeve to engage said discharge element; and means for holding the discharge element against said sleeve so as to be oscillated during and consequent upon the rotation of the sleeve.

5. A grinding mill comprising a pair of grinding members adapted to receive material between them to be ground; means for rotating one of said grinding members; means holding the two grinding members in operative relation to each other; and means acting automatically, when the friction effect between one grinding member and the said material exceeds a predetermined limit, to enable that member to move differently from the normal rotation of the rotary grinding member and to cause the said friction effect to decrease.

6. A grinding mill, comprising a pair of grinding members; means for rotating one of said grinding members; means holding the two grinding members in operative relation to each other; a feeding device for delivering the material to be ground to the grinding members; means enabling one of the grinding members, when the friction effect between the same and the said material exceeds a predetermined limit, to move differently from the normal rotation of the rotary grinding member and to cause said different motion to influence the feeding device in a manner to diminish the supply of material to the grinding members.

7. A grinding mill comprising a pair of grinding members; means for rotating one of said members; means holding the two grinding members in operative relation to each other; a feeding device for delivering the material to be ground to the grinding members; and means acting automatically, when the friction effect between one grinding member and the said material exceeds a predetermined limit, to enable that member to move bodily away from the other grinding member and to cause such motion to influence the feeding device in a maner to diminish the supply of material to the grinding members.

8. A grinding mill comprising a rotary grinding member; a normally stationary grinding member; means holding the two grinding members in operative relation to each other; a feeding device for delivering the material to be ground to the grinding members; and means acting automatically, when the friction effect between one grinding member and the said material exceeds a predetermined limit, to enable that member to move bodily away from the other grinding member and to influence the feeding device in a manner to diminish the supply of material to the grinding members.

9. A grinding mill comprising a rotary grinding member; a normally stationary grinding member; means for holding the two grinding members in operative relation to each other; a feed hopper for the material to be ground; a movable discharge element carrying the said material to the grinding members; means connected to be rotated together with the rotary grinding member for imparting an oscillating motion to said discharge element; means acting automatically, when the fricton effect between one grinding member and the said material exceeds a predetermined limit, to enable that member to move bodily away from the other grinding member; and means to reduce the movements of the discharge element in order to diminish the supply of material to the grinding members when such excess friction occurs.

10. A grinding mill, comprising a pair of coacting grinding members; a rotary shaft to which one member is secured; a normally stationary shaft carrying the other member; a feed hopper for the material to be ground; a movable discharge element carried by said hopper to deliver the material between said members; a sleeve connected to the rotary shaft to rotate therewith and provided with a cam; means for yieldingly holding said discharge element against said sleeve so as to be oscillated during and consequent upon the rotation of the sleeve; means for enabling the grinding members to move bodily away from one another when the friction effect between said material and said grinding members exceeds a predetermined limit; and means acting automatically to reduce the oscillation of the discharge element when such excess friction occurs.

11. A grinding mill, comprising a hollow rotary shaft; driving means therefor; a grinding member secured to said shaft; a normally stationary shaft extending through the hollow shaft; a yoke carried by the stationary shaft; a grinding member rigidly secured to the yoke for coaction with the first-named member in grinding material introduced between them; a feed hopper; a swinging discharge element carried by said hopper for delivering the material therefrom to the grinding members; a sleeve secured to the rotary shaft to rotate therewith and through which the stationary shaft extends; a cam sleeve to engage said discharge element; means for holding the discharge element against said sleeve so as to be oscillated during and consequent upon the rotation of the sleeve; a supporting member fixed to the stationary shaft and carrying the said yoke, said supporting member having an inclined face to cause axial displacement of the yoke and the grinding member attached thereto, if that grinding member is forced to rotate due to an overload of the mill; and means for reducing the movement of the discharge element when the normally stationary grinding member is rotated.

12. A grinding mill, comprising a rotary shaft; a grinding member secured thereto; a normally stationary shaft; a grinding member loosely carried thereby; a feeding device for the material to be ground; a movable element to deliver the material from the feeding device to the grinding members; means connected to be rotated by the rotary shaft for imparting an oscillating motion to said movable element; and means acting automatically, when the friction effect between the grinding member carried by the stationary shaft and the material exceeds a predetermined limit, to enable that member to move bodily on said stationary shaft away from the other grinding member.

In testimony whereof he affixes his signature.

SILIAM BJERRE.